United States Patent
Kupratis et al.

(10) Patent No.: US 11,873,766 B2
(45) Date of Patent: Jan. 16, 2024

(54) DIFFERENTIAL GEARED AMPLIFICATION OF AUXILIARY POWER UNIT

(71) Applicant: Raytheon Technologies Corporation, Farmington, CT (US)

(72) Inventors: Daniel Bernard Kupratis, Wallingford, CT (US); Neil J. Terwilliger, Cheshire, CT (US); Michael M. Romero, Manchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/115,986

(22) Filed: Mar. 1, 2023

(65) Prior Publication Data

US 2023/0212985 A1 Jul. 6, 2023

Related U.S. Application Data

(62) Division of application No. 16/145,431, filed on Sep. 28, 2018, now Pat. No. 11,629,646.

(51) Int. Cl.
*F02C 7/32* (2006.01)
*F02C 7/36* (2006.01)
*F16H 3/72* (2006.01)

(52) U.S. Cl.
CPC ............. *F02C 7/32* (2013.01); *F02C 7/36* (2013.01); *F05D 2220/50* (2013.01); *F05D 2260/40311* (2013.01); *F16H 3/724* (2013.01)

(58) Field of Classification Search
CPC ............ F05D 2220/50; F05D 2220/76; F05D 2260/40311; F02C 7/32; F02C 7/36; F02C 7/277; B64D 2013/0611; F16H 3/724; B60K 6/365; B60K 6/48
See application file for complete search history.

(56) References Cited

U.S. PATENT DOCUMENTS

| | | | |
|---|---|---|---|
| 5,039,281 A * | 8/1991 | Johnston | F04B 9/02 475/5 |
| 5,137,230 A | 8/1992 | Coffinberry | |
| 5,553,449 A * | 9/1996 | Rodgers | F02C 7/12 60/39.83 |
| 5,752,379 A | 5/1998 | Schafer et al. | |
| 8,424,280 B2 | 4/2013 | Moore et al. | |
| 8,561,383 B2 | 10/2013 | Suciu et al. | |
| 8,674,536 B2 | 3/2014 | Eitan et al. | |

(Continued)

OTHER PUBLICATIONS

European Search Report for European Application No. 19200614.6 dated Feb. 19, 2020.

*Primary Examiner* — Todd E Manahan
*Assistant Examiner* — David P. Olynick
(74) *Attorney, Agent, or Firm* — Carlson, Gaskey & Olds, P.C.

(57) ABSTRACT

A disclosed drive assembly for an auxiliary power unit includes a first drive shaft driven by an auxiliary power unit, a second drive shaft driven by a first electric motor, a differential gear system including a ring gear driven by the second drive shaft, a and planet gears supported within a carrier attached to the ring gear. The first drive shaft and an output shaft are coupled to the planet gears and a generator is driven by the output shaft. The electric motor and the auxiliary power unit combine to drive the output shaft.

19 Claims, 3 Drawing Sheets

(56) References Cited

U.S. PATENT DOCUMENTS

| | | | |
|---|---|---|---|
| 2006/0260323 A1* | 11/2006 | Moulebhar | F02C 6/08 |
| | | | 60/793 |
| 2007/0267540 A1 | 11/2007 | Atkey et al. | |
| 2008/0058149 A1 | 3/2008 | Yang | |
| 2008/0138195 A1 | 6/2008 | Kern et al. | |
| 2010/0024434 A1 | 2/2010 | Moore et al. | |
| 2012/0119021 A1* | 5/2012 | Burns | B64D 27/16 |
| | | | 244/58 |
| 2012/0138737 A1 | 6/2012 | Bruno et al. | |
| 2012/0319661 A1 | 12/2012 | Moore et al. | |
| 2015/0336453 A1 | 11/2015 | Pinschmidt | |
| 2016/0348788 A1 | 12/2016 | Lemmers, Jr. et al. | |
| 2017/0074171 A1 | 3/2017 | Takenaka et al. | |
| 2017/0248081 A1 | 8/2017 | Roach et al. | |
| 2017/0284408 A1 | 10/2017 | Ricordeau et al. | |

\* cited by examiner

DIFFERENTIAL GEARED AMPLIFICATION OF AUXILIARY POWER UNIT

CROSS REFERENCE TO RELATED APPLICATION

This application is a divisional of U.S. application Ser. No. 16/145,431 filed on Sep. 28, 2018.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Auxiliary power units are small gas turbine engines that are used to drive accessories such as electric generators or other accessory drive systems. Operation of the gas turbine engine is most efficient at fixed operating conditions. Differing loads on the auxiliary power units can reduce efficiency by moving operation away from the most efficient operating conditions.

Turbine engine manufacturers continue to seek further improvements to engine performance including improvements to thermal, transfer and propulsive efficiencies.

SUMMARY

A drive assembly for an auxiliary power unit according to an exemplary embodiment of this disclosure includes, among other possible things, a first drive shaft driven by an auxiliary power unit; a second drive shaft driven by a first electric motor; a differential gear system including a ring gear driven by the second drive shaft, planet gears supported within a carrier attached to the ring gear wherein the first drive shaft and an output shaft is coupled to the planet gears; and a generator driven by the output shaft, wherein the electric motor and the auxiliary power unit combine to drive the output shaft.

In a further embodiment of the foregoing drive assembly for an auxiliary power unit, a speed of the first electric motor is varied to adjust a speed of the output shaft and the speed of the first drive shaft is constant over a predefined operating range.

In another embodiment of any of the foregoing drive assemblies for an auxiliary power unit, the generator provides electric power to a second electric motor coupled to a spool of a gas turbine engine.

In another embodiment of any of the foregoing drive assemblies for an auxiliary power unit, the auxiliary power unit includes a first compressor coupled to a first turbine and the first drive shaft.

In another embodiment of any of the foregoing drive assemblies for an auxiliary power unit, the first drive shaft and first compressor are disposed along an APU rotational axis.

In another embodiment of any of the foregoing drive assemblies for an auxiliary power unit, the first drive shaft and the first turbine are disposed along an APU rotational axis.

In another embodiment of any of the foregoing drive assemblies for an auxiliary power unit, the second drive shaft is disposed along an axis transverse to the APU rotational axis.

In another embodiment of any of the foregoing drive assemblies for an auxiliary power unit, the output shaft is coupled to drive an auxiliary compressor.

In another embodiment of any of the foregoing drive assemblies for an auxiliary power unit, the auxiliary compressor is in communication with a turbine section of a gas turbine engine.

In another embodiment of any of the foregoing drive assemblies for an auxiliary power unit, the auxiliary compressor is in communication with an environmental control system of an aircraft.

In another embodiment of any of the foregoing drive assemblies for an auxiliary power unit, a controller that controls operation of the auxiliary power unit and the first electric motor provides a predefined speed of the output shaft.

A gas turbine engine assembly according to an exemplary embodiment of this disclosure includes, among other possible things, a main gas turbine engine including a compressor section communicating compressed air to a combustor section where fuel is combined with the compressed air and ignited to generate a high energy flow that expands through a turbine section, wherein the turbine section is coupled to the compressor section by a main shaft; an auxiliary power unit including an APU compressor coupled to an APU turbine section along an APU drive shaft; a differential gear system including a ring gear and planet gears supported within a carrier attached to the ring gear, wherein the APU drive shaft is engaged to the planet gears; a first drive means engaged to drive the ring gear; an output shaft engaged to the planet gears; a generator driven by the output shaft; and a second drive means coupled to the main shaft of the main gas turbine engine for applying a partial drive load to the main shaft.

In a further embodiment of the foregoing gas turbine engine assembly, the output shaft drives an auxiliary compressor, and the auxiliary compressor provides supplemental flow to the turbine section.

In another embodiment of any of the foregoing gas turbine engine assemblies, the first drive means comprises a first electric motor coupled through a first drive shaft to drive the ring gear at a predefined speed to provide a predefined output speed when combined with an output speed provided by the first drive shaft driven by the auxiliary power unit.

In another embodiment of any of the foregoing gas turbine engine assemblies, the second drive means comprises a second electric motor coupled to the main shaft through a gear coupling.

In another embodiment of any of the foregoing gas turbine engine assemblies, a controller controls a rotational speed of the output shaft by varying an input speed of the first drive shaft driving the ring gear and the APU drive shaft driving the planet gears.

In another embodiment of any of the foregoing gas turbine engine assemblies, operation of the first drive means and the second drive means varies for selectively varying loads on the auxiliary power unit and the main gas turbine engine.

A method of operating a gas turbine engine according to an exemplary embodiment of this disclosure includes, among other possible things, driving a planet gear of a differential gearbox with an APU shaft driven by an auxiliary power unit; driving a ring gear of the differential gearbox with a first electric motor; and varying a speed of an output shaft from the differential gearbox by adjusting a speed of the electric motor while maintaining a constant speed of the APU shaft.

In a further embodiment of the foregoing method of operating a gas turbine engine, the output shaft drives the load compressor and selectively supplies bleed airflows from the load compressor to a main engine. The engine comprises a gas turbine engine including a main compressor section and a main turbine section coupled through a main shaft, and the bleed airflows from the load compressor are communicated to the main turbine.

In another embodiment of any of the foregoing gas turbine engine assemblies, the output shaft drives an electric generator and a second electric motor coupled to the main shaft of the main engine.

In another embodiment of any of the foregoing gas turbine engine assemblies, the output shaft drives a load compressor and selectively supplies bleed airflows from the load compressor to an aircraft environmental control system.

In another embodiment of any of the foregoing gas turbine engine assemblies, a speed of the APU shaft and a speed of the first electric motor varies to control a speed of the output shaft.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
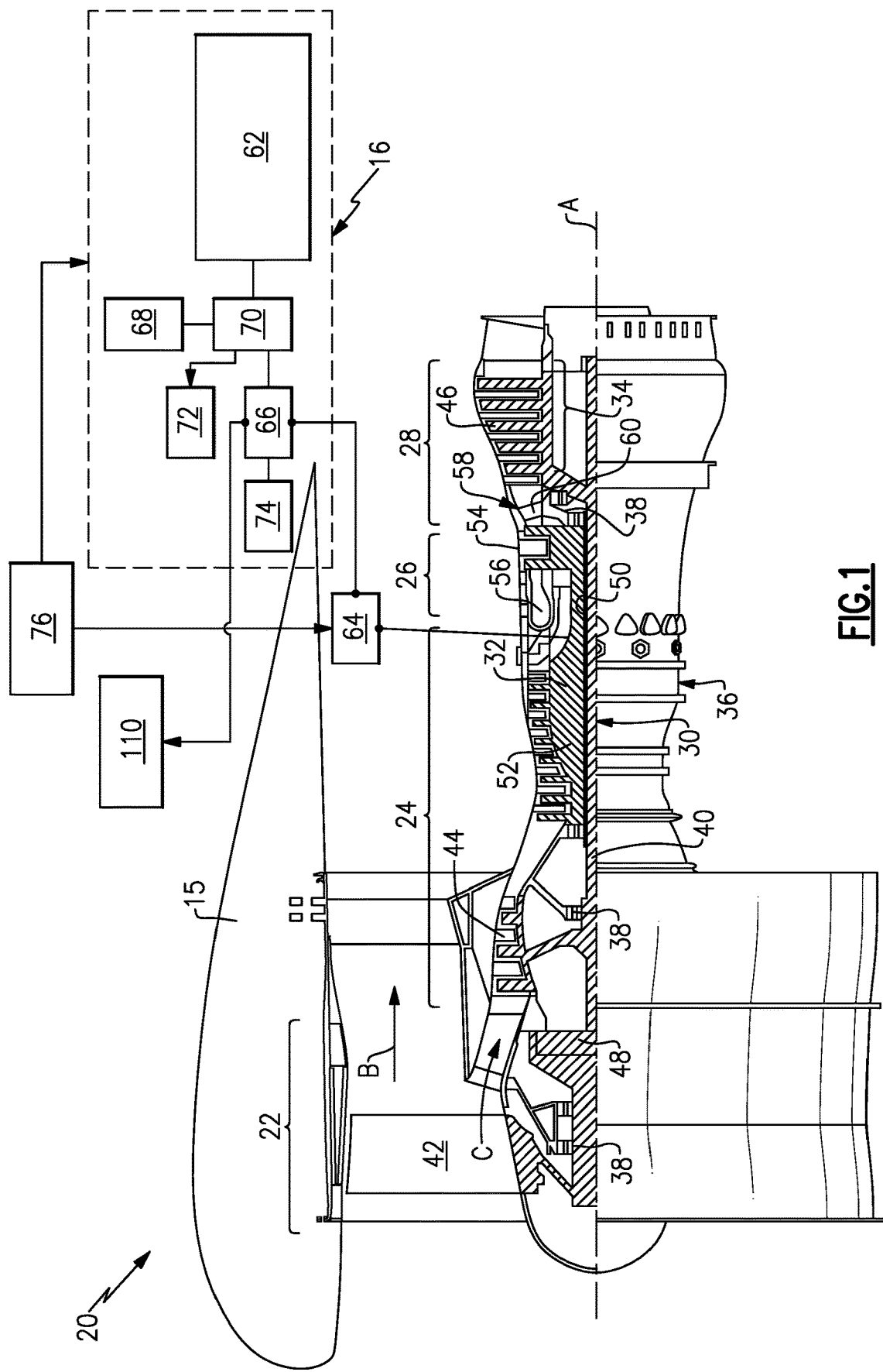
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 meters/second).

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The example gas turbine engine 20 includes an auxiliary power unit assembly 16 that drives a generator 66. The generator 66 in turn provides electric power to an aircraft electric power network 110 and an electric motor 64 coupled to the high speed spool 32. The auxiliary power unit assembly 16 includes an auxiliary power unit 62 that drives a drive system 70 that in turn drive the generator 66. The drive system 70 may also drive an auxiliary gearbox 72 utilized to drive accessory devices such as hydraulic pumps, fuel pumps, lubricant pumps and other accessory devices utilized to support operation of the gas turbine engine 20. The drive system 70 may also drive an auxiliary compressor 74. The drive system 70 is driven by inputs from both the auxiliary power unit 62 and a first drive means 68. The first drive means 68 is an electric motor that aids in adjusting and varying a speed of an output utilized to drive the generator 66 and the auxiliary power unit 62.

The electric motor 64 coupled to the high speed spool 32 can be operated to start the engine 20. The electric motor 64 may also be utilized to accommodate variations in loads on the high speed spool 32 during engine operation.

Figure 2:
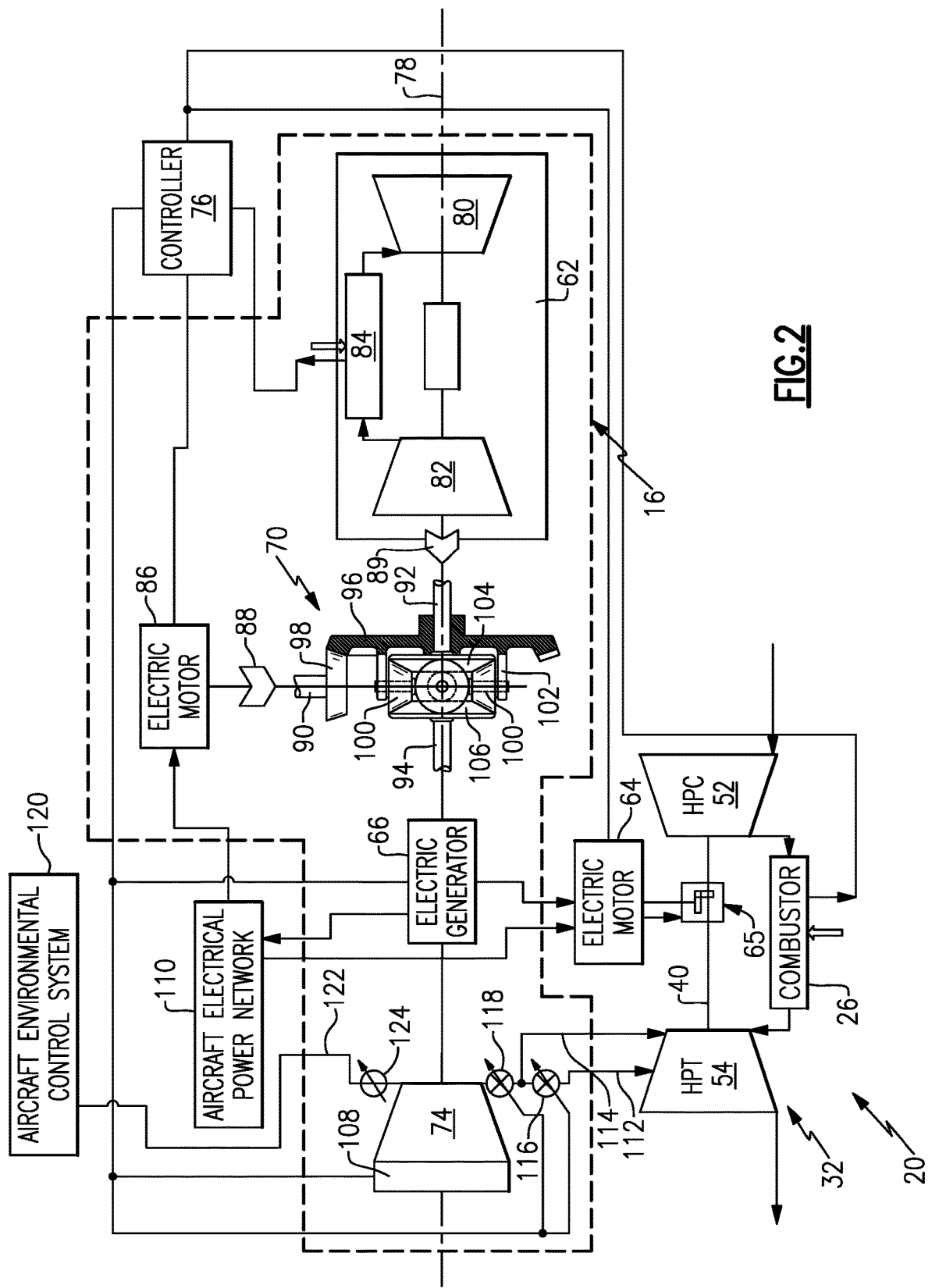
FIG. 2 is a schematic view of an example auxiliary power unit assembly embodiment and a portion of the example gas turbine engine.

Referring to FIG. 2 with continued reference to FIG. 1, the example auxiliary power unit assembly 16 is coupled to the drive system 70 that is a differential gearbox. The drive system 70 includes a ring gear 96 that is driven by a pinion gear 98 driven by the electric motor 86. The electric motor 86 drives a first shaft 90 that is coupled to the ring gear 96 by the pinion gear 98. A clutch 88 is provided between the first shaft 90 and the electric motor 86 such that electric motor 86 may not be back driven by the drive system 70. Only rotation in one direction is communicated to drive the ring gear 96. In this example, the clutch 88 is a mechanical sprag clutch that does not require controller input for actuation.

The disclosed example auxiliary power unit 62 includes an APU compressor 82 that compresses air and communicates that air to an APU combustor 84. In the APU combustor 84 fuel is mixed with the compressed air and ignited to generate a high energy exhaust gas flow. The high energy exhaust gas flow expands through an APU turbine 80 that drives the compressor 82 through the shaft 92. Variations on loads on the auxiliary power unit 62 are conventionally accommodated by adjusting fuel flow to change operation. The example auxiliary power unit assembly 62 uses the electric motor 86 to accommodate some of the variations in load so that the auxiliary power unit 62 can operate at a sustained and efficient speeds. It should be appreciated that although a gas turbine auxiliary power unit is disclosed by way of example, other engines and devices could be utilized with the disclosed drive system 70 and are within the contemplation and scope of this disclosure.

Optionally, a clutch 89 is provided between the shaft 92 and the drive system 70 such that APU 62 may not be back driven by the drive system 70. Only rotation in one direction is communicated to drive the shaft 92. In this example, the clutch 89 is a mechanical sprag clutch that does not require controller input for actuation.

The ring gear 96 supports a carrier 102 that supports planet gears 100. The planet gears 100 are coupled to a pinion gear 104 coupled to an APU shaft 92 and a pinion gear 106 coupled to the output shaft 94. The APU shaft 92 and output shaft 94 are disposed along a common APU longitudinal axis 78. The output shaft 94 drives the generator 66 and an auxiliary compressor 74. The auxiliary compressor 74 is also referred to as a load compressor 74. In this example the generator 66 and auxiliary compressor, 74 are disposed along the APU axis 78. However, other configurations and relative orientations of the auxiliary compressor 74 and the electric generator 66 are within the scope and contemplation of this disclosure.

Rotation of the APU shaft 92 and the first shaft 90 driven by the electric motor 86 combine to provide the output speed of the output shaft 94 that drives the generator 66. Accordingly, the speed of the auxiliary power unit 62 may operate at a speed different than the speed of the output shaft 94. The different operating speeds enable operation of the auxiliary power unit 62 at a more efficient speed while enabling operation of the electric generator 66 at higher efficient speeds. The electric motor 86 drives the first shaft 90 to enable variations in the speed of the output shaft 94 to accommodate changes in loads rather than changing the operating speed of the auxiliary power unit 62 away from efficient operating speeds.

The electric generator 66 powers a second electric motor 64 that is coupled through a gear coupling schematically shown at 65 to the high speed spool 32. The electric motor 64 provides an additional drive to accommodate changes in load on the high speed spool 32 during operation. The added torque to the high speed spool 32 provided by the electric motor 64 can reduce variations in loads on the high speed spool 32 that can reduce engine efficiencies. The electric motor 64 can increase or decrease torque applied to the high speed spool 32 to accommodate engine operation without changing operation of the high speed spool 32. It should be appreciated that although the high speed spool 32 is disclosed and explained by way of example, that the low speed spool 30 or other intermediate spools of a gas turbine engine could also be coupled to an electric motor either instead of the high speed spool 32 or in addition to the high speed spool 32.

Additionally, the output shaft 94 drives the auxiliary compressor 74 at a speed different than that of the auxiliary power unit 62. Inlet guide vanes shown schematically at 108 direct airflow into the auxiliary compressor 74. The auxiliary compressor 74 in turn provides compressed air to an aircraft cabin environmental control system (ECS) 120 via bleed air passage 122. The auxiliary compressor 74 is in communication with bleed air passage 122 that supplies air to the ECS. Valve 124 governs the flow of bleed airflow to the ECS. The auxiliary compressor 74 is in communication with bleed air passages 112 and 114 that supply bleed airflow to the high pressure turbine 54. Valves 116 and 118 govern the flow of bleed airflow to the high pressure turbine 54 to increase operational efficiency.

The bleed airflows 112, 114 supplement the high pressure turbine 54 cooling air flow and increase the efficiency of turbine cooling at higher turbine inlet temperatures such as at aircraft takeoff and climb operations. The bleed airflow through air passage 112 enters high pressure turbine 54 downstream of the choked flow condition in the high pressure turbine 54 and does not substantially affect the pressure ratio and flow of high pressure compressor 52.

The bleed airflow through air passage 114 enters high pressure turbine 54 upstream of the choked flow condition in the high pressure turbine 54 and does substantially affect the pressure ratio and flow characteristics of high pressure compressor 52. Increasing bleed airflow through air passage 114 reduces airflow of high pressure compressor 52 and increases a pressure ratio of high compressor 52 and increases engine 20 efficiency at lower power such as for example at the bucket cruise condition. Decreasing bleed airflow through air passage 114 increases airflow of high pressure compressor 52 and reduces the pressure ratio of high compressor 52 and increases engine 20 power as needed at the aircraft takeoff and climb conditions.

The reduction in pressure ratio of the high compressor 52 reduces the inlet temperature to the combustor 26 and enables a larger temperature rise across the combustor 26 to increase engine 20 power output as needed at the aircraft takeoff and climb conditions. Inlet guide vanes 108 control the airflow of auxiliary compressor 74 in response to bleed airflows 112, 114, and 122 and the speed of shaft 94 to maintain higher efficiency of the auxiliary compressor 74.

The APU 62 and electric motor 86 drive auxiliary compressor 74. The auxiliary compressor 74 supplements the flow and varies the flow and pressure ratio of high compressor 52. The APU 62 and electric motor 64, through the impact of bleed airflow from auxiliary compressor 74, enhance the operation of engine 20, and the APU 62 and electric generator 66, through the impact of torque from electric motor 64, enhance the operation of engine 20. The electric motor 86 and drive system 70 enhance the operation of APU 62 as APU assembly 16 enhances the operation of engine 20. The controller 76 adjusts operation of the electric motor 86 and the auxiliary power unit 62 to provide the desired power and bleed airflow output of APU assembly 16 and maintains the auxiliary power unit 62 at efficient and steady state conditions for longer periods of operation.

Figure 3:
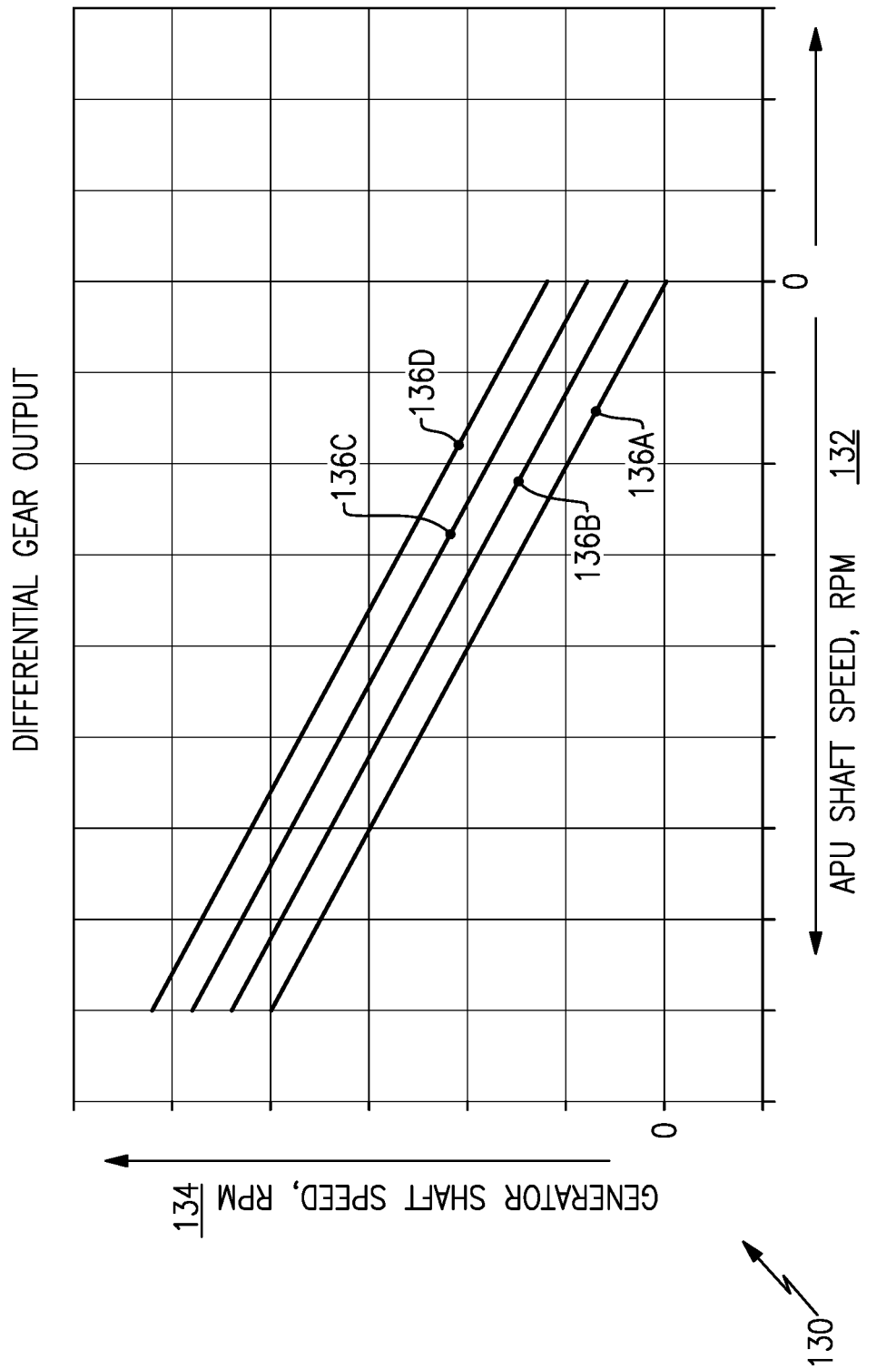
FIG. 3 is a graph illustrating relationships between rotational speeds of inputs and outputs of the example auxiliary power unit assembly.

Referring to FIG. 3 with continued reference to FIG. 2, graph 130 illustrates a relationship between the inputs provided by the electric motor 86 and the auxiliary power unit 62 to the drive system 70 and the output provided to the output shaft 94. In this example, the direction of rotation of the auxiliary power unit 62 is opposite the rotation of the output shaft 94. This is indicated by the different directions of the arrows shown on the axes of the graph 130. The different lines 136A-D represent rotational speeds of the electric motor 86. As is shown, the relationship between the input speed indicated at 132 from the auxiliary power unit 62 and the speed 134 of the output shaft 94 is substantially linear. The specific relationship is dependent on the specific gear ratio provided by the drive system 70. It should be understood that any gear ratio between the APU shaft 92 and the output shaft 94 that provides the desired operational speed of the generator 66 and the auxiliary power unit 62 could be utilized and is within the contemplation of this disclosure.

The first line 136A is indicative of relationship of speeds with the electric motor 86 fixed such that no speed or torque is added by the electric motor 86. Moving up to, the second line 136B illustrates how the addition of power from the electric motor 86 will increase the output speed of the output shaft 94 without increasing the speed provided by the APU shaft 92. A further increase in speed of the electric motor 86 illustrated by the third line 136C shows the further increase in output speed shown at 134 without additional power or speed provided by the auxiliary power unit 62. A fourth line 136D illustrates a further increase in speed and power input from the electric motor 86 to provide different and increasing output speeds to the output shaft 94. As appreciated, the speed of the electric motor 86 may be varied outside of the lines shown in the graph 130 to adjust the output speed to drive the generator without changing operation of the auxiliary power unit 62.

Accordingly, in operation, the auxiliary power unit 62 will be operated at a predefined speed to provide a desired output speed of the output shaft 94 to drive the generator 66. As loads on the generator 66 change, the electric motor 86 can be operated to add power and increase or decrease speeds without adjusting operation of the auxiliary power unit 62. When the demand for power and speed increases beyond that capable of being accommodated by the electric motor 86, the auxiliary power unit 62 is adjusted to provide increased speed and power. The controller 76 adjusts operation of the electric motor 86 and the auxiliary power unit 62 to provide the desired power output through the output shaft 94 to maintain the auxiliary power unit at efficient and steady state conditions for longer periods of operation.

When the shaft 92 speed is zero and the APU 62 is not operating, the electric motor 86 and drive system 70 can provide power to auxiliary compressor 74 and electric generator 66 as needed by engine 20 and the ECS 120. APU 62 may be selectively operated or not operated at all. Additionally, the electric motor 86 and drive system 70 can provide power to auxiliary compressor 74 and electric generator 66 as needed by engine 20 and the ECS 120 in the event of failure of APU 62.

Additionally, loads on the high speed spool 32 can be aided by the electric motor 64 that draws power from the generator 66. Increased loads on the high spool 32 can be first accommodated by increased power input from the electric motor 64. The variations in power required by the electric motor 64 are accommodated by adjustments in the electric motor 86 and auxiliary power unit 62 through the two inputs to the drive system 70.

Additionally, bleed from auxiliary compressor 74 to ECS 120 can be first accommodated by increased power input from the electric motor 86. The variations in bleed flow required by the ECS 120 are accommodated by adjustments in the electric motor 86 and auxiliary power unit 62 through the two inputs to the drive system 70.

Accordingly, the example auxiliary power unit assembly 16 provides additional power and torque to accommodate variations in power and loads while enabling operation of the auxiliary power unit 62 and gas turbine engine 20 at more efficient settings.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine assembly comprising:
a main gas turbine engine including a compressor section communicating compressed air to a combustor section where fuel is combined with the compressed air and ignited to generate a high energy flow that expands through a turbine section, wherein the turbine section is coupled to the compressor section by a main shaft;
an auxiliary power unit including an APU compressor coupled to an APU turbine section along an APU drive shaft;
a differential gear system including a ring gear and planet gears supported within a carrier attached to the ring gear, wherein the APU drive shaft is engaged to the planet gears;
a first drive means engaged to drive the ring gear;
an output shaft engaged to the planet gears; a generator driven by the output shaft;
a second drive means coupled to the main shaft of the main gas turbine engine for applying a partial drive load to the main shaft; and
a controller configured to control operation of the first drive means, the auxiliary power unit and the generator, where the controller is configured to: based on a determination that an increase in a demand for power on the generator is below a threshold demand, increase a speed of the first drive means to increase a power output from the generator to meet the demand while maintaining the APU at a constant speed; and based on a determination that the demand for power is above the threshold, increase the speed of the APU to increase the power output from the generator to meet the demand for power.

2. The gas turbine engine as recited in claim 1, including an auxiliary compressor driven by the output shaft, the auxiliary compressor providing supplemental flow to the turbine section.

3. The gas turbine engine as recited in claim 2, wherein the auxiliary compressor is in communication with an environmental control system of an aircraft.

4. The gas turbine engine as recited in claim 1, wherein the first drive means comprises a first electric motor coupled through a first drive shaft to drive the ring gear at a predefined speed to provide a predefined output speed when combined with an output speed provided by the APU drive shaft driven by the auxiliary power unit.

5. The gas turbine engine as recited in claim 4, wherein the first drive shaft is disposed along an axis transverse to the APU rotational axis.

6. The gas turbine engine as recited in claim 4, wherein the second drive means comprises a second electric motor coupled to the main shaft through a gear coupling.

7. The gas turbine engine as recited in claim 1, including varying operation of the first drive means and the second drive means for selectively varying loads on the auxiliary power unit and the main gas turbine engine.

8. The gas turbine engine as recited in claim 1, wherein the APU compressor and APU turbine are coupled to the APU drive shaft.

9. The gas turbine engine as recited in claim 7, wherein the APU drive shaft, the APU turbine and the APU compressor are disposed along the APU rotational axis.

10. The gas turbine engine as recited in claim 1, further including a first clutch provided on the APU drive shaft configured to selectively decouple the APU drive shaft from the differential gear system for preventing back driving of the auxiliary power unit.

11. The gas turbine engine as recited in claim 10, further including a second clutch disposed on a first drive shaft, coupled to the first drive means, configured to selectively decouple the first drive shaft from the differential gear system for preventing back driving of the first drive means.

12. The gas turbine engine as recited in claim 11, wherein the first clutch and the second clutch are configured to automatically decouple the corresponding one of the APU drive shaft and the first drive shaft from the differential gear system without input from the controller.

13. The gas turbine engine as recited in claim 1, further comprising a first drive shaft coupled to the first drive means wherein the controller is further configured to provide a desired bleed airflow from an auxiliary compressor by adjusting a speed of the first drive shaft.

14. The gas turbine engine as recited in claim 1, wherein the controller is further configured to control the first drive means to drive the differential gear system when the auxiliary power unit is not rotating the APU drive shaft.

15. A method of operating a gas turbine engine comprising:
providing a main gas turbine engine including a compressor section communicating compressed air to a combustor section where fuel is combined with the compressed air and ignited to generate a high energy flow that expands through a turbine section, wherein the turbine section is coupled to the compressor section by a main shaft; an auxiliary power unit including an APU compressor coupled to an APU turbine section along an APU drive shaft; a differential gearbox including a ring gear and planet gears supported within a carrier attached to the ring gear, wherein the APU drive shaft is engaged to the planet gears; a first electric motor engaged to drive the ring gear; an output shaft engaged to the planet gears; a generator driven by the output shaft; a second drive means coupled to the main shaft of the main gas turbine engine for applying a partial drive load to the main shaft; and a controller configured to control operation of the first drive means, the auxiliary power unit and the generator, where the controller is configured to: based on a determination that an increase in a demand for power on the generator is below a threshold demand, increase a speed of the first drive means to increase a power output from the generator to meet the demand while maintaining the APU at a constant speed; and based on a determination that the demand for power is above the threshold, increase the speed of the APU to increase the power output from the generator to meet the demand for power;
driving the planet gears of the differential gearbox with the APU shaft driven by the auxiliary power unit;
driving the ring gear of the differential gearbox with the first electric motor; and
varying the speed of the output shaft from the differential gearbox by adjusting the speed of the electric motor while maintaining the constant speed of the APU shaft.

16. The method as recited in claim 15, including driving a load compressor with the output shaft and selectively supplying bleed airflows from the load compressor to the turbine section.

17. The method as recited in claim 16, wherein the second drive means is a second electric motor including driving an electric generator with the output shaft and driving the second electric motor coupled to the main shaft of the main gas turbine engine.

18. The method as recited in claim 17, including selectively supplying bleed airflows from the load compressor to an aircraft environmental control system.

19. The method as recited in claim 18, including varying the speed of the APU shaft and the speed of the first electric motor to control a speed of the output shaft.

* * * * *